United States Patent
Hu et al.

(10) Patent No.: US 9,014,766 B2
(45) Date of Patent: Apr. 21, 2015

(54) PROTECTIVE CLAMP FRAME HAVING POWER AND UNCLAMP DUPLEX BUTTON FOR MOBILE COMMUNICATION DEVICES

(71) Applicant: Taer Inno Co., Ltd., Taipei (TW)

(72) Inventors: Li-Ming Hu, Taipei (TW); Yu-Chun Lu, Taipei (TW); Chih-Sheng Wang, Taipei (TW)

(73) Assignee: Taer Innovation Co., Ltd., New Taipei (TW)

( * ) Notice: Subject to any disclaimer, the term of this patent is extended or adjusted under 35 U.S.C. 154(b) by 59 days.

(21) Appl. No.: 13/751,155

(22) Filed: Jan. 28, 2013

(65) Prior Publication Data

US 2014/0024418 A1     Jan. 23, 2014

(30) Foreign Application Priority Data

Jul. 20, 2012   (TW) .............................. 101126248 A

(51) Int. Cl.
  *H04M 1/00*   (2006.01)
  *H04M 1/02*   (2006.01)
  *H04M 1/04*   (2006.01)

(52) U.S. Cl.
  CPC ................ *H04M 1/026* (2013.01); *H04M 1/04* (2013.01); *H04B 1/3888* (2013.01)

(58) Field of Classification Search
  USPC .............................. 455/575.8, 575.1; 361/752
  See application file for complete search history.

(56) References Cited

U.S. PATENT DOCUMENTS

| | | | | |
|---|---|---|---|---|
| 5,584,384 | A * | 12/1996 | Mizuno et al. ................. | 200/524 |
| D654,483 | S * | 2/2012 | Richardson et al. ......... | D14/250 |
| 8,240,721 | B2 * | 8/2012 | Chang et al. ..................... | 292/80 |
| 8,342,325 | B2 * | 1/2013 | Rayner .......................... | 206/320 |
| 8,531,834 | B2 * | 9/2013 | Rayner ..................... | 361/679.56 |
| D694,227 | S * | 11/2013 | Rayner ......................... | D14/250 |
| 2012/0031914 | A1 * | 2/2012 | Liu ................. | 220/662 |
| 2012/0074005 | A1 * | 3/2012 | Johnson et al. ............... | 206/320 |
| 2012/0118772 | A1 * | 5/2012 | Ellis-Brown .................. | 206/320 |
| 2012/0228885 | A1 * | 9/2012 | Fang et al. ..................... | 292/162 |
| 2012/0250270 | A1 * | 10/2012 | Liu ............................... | 361/752 |
| 2012/0327615 | A1 * | 12/2012 | Waters et al. ................. | 361/752 |

FOREIGN PATENT DOCUMENTS

| TW | 200603710 A | 1/2006 |
|---|---|---|
| TW | M417750 U1 | 12/2011 |
| TW | M430795 U1 | 6/2012 |

* cited by examiner

*Primary Examiner* — Kashif Siddiqui
*Assistant Examiner* — Mong-Thuy Tran
(74) *Attorney, Agent, or Firm* — Li & Cai Intellectual Property (USA) Office

(57) ABSTRACT

A protective clamp frame having a power and unclamp duplex button for mobile communication devices is disclosed, comprising a main frame, an auxiliary frame and a connection control element, wherein the main frame and the auxiliary frame are both configured in a closed frame structure, and the main frame is formed with a central recessed accommodating part for receiving a mobile communication device, further overlapped with the auxiliary frame, such that the lateral sides of the mobile communication device can be peripherally wrapped; in addition, the connection control element can release the connection between the main frame and the auxiliary frame and operate to engage in touch with the power switch on the mobile communication device in order to provide a duplex structure having power activation and unclamp frame features.

10 Claims, 8 Drawing Sheets

PROTECTIVE CLAMP FRAME HAVING POWER AND UNCLAMP DUPLEX BUTTON FOR MOBILE COMMUNICATION DEVICES

BACKGROUND OF THE INVENTION

1. Field of the Invention

The present invention generally relates to a protective clamp frame having a power and unclamp duplex button for mobile communication devices; in particular, the present invention relates to a duplex structure allowing power activation and frame unclamping features simply by means of a single button.

2. Description of Related Art

Significant advancement in communication technologies has been made essentially thanks to, on one hand, the growth of network as well as, on the other hand, presence of numerous and various types of revolutionary smart phones based on incessant technical breakthroughs in the mobile communication field during the last two decades. Mobile electronic devices of newer generations, such as smart phones, pad computers or so forth, provide many useful features like the touch screen and more human-friendly user interfaces such that more powerful functions, including network data uploads and downloads, on-line games or video/audio information playing, can be effectively implemented thereby continuously pushing forward the mobile communication technologies thus gradually crossing over the boundary thereof with general personal computers or video/audio appliances.

However, due to enlarged screens installed thereon for better and more vivid graphic data presentations, such smart phones and pad computers of newer generation may be more vulnerable to physical impacts, scratches or damages as well. Therefore, users often purchase additional protective frames or sacs to reduce such impairment risks. A conventional protective frame is shown in FIG. 1, comprising two L-shaped frame bodies 11, 12; in addition, to allow more robust integral assembly, such a frame body 11, 12 is further respectively formed with a guiding groove 110, 120 for installation guidance onto the lateral side of the mobile phone 2. In assembly, it needs first to place the guiding groove 110 in a frame body 11 close to two neighboring lateral sides of the mobile phone 2 until the frame body 11 is completely attached thereonto, then place the guiding groove 120 in the other frame body 12 to the other two neighboring lateral sides of the mobile phone 2 in the same fashion until the two ends of the frame body 12 are in contact with the two ends of the frame body 11, further mutually fastening the two frame bodies 11 and 12 with screws, thus constituting a protective frame surrounding the lateral periphery of the mobile phone 2. Whereas, during the process, too many separate parts may cause inconvenience in installation operations.

Also, another type of conventional protective frames is shown in FIG. 2, including two U-shaped frame bodies 13, 14 respectively formed with a guiding groove 130, 140 for installation guidance to the left and right lateral sides of the mobile phone 2. In assembly, the frame body 13, 14 slides along the two lateral sides of the mobile phone 2 through the guiding groove 130, 140 until it is completely attached to the lateral side of the mobile phone 2, then further using the same way to fasten the frame body 13, 14, so a protective frame installed in accordance with a different structure and assembly fashion can be completed. But, in case the machining molds can not provide good precisions thus unfortunately leading to ragged or rough edges, these sleeve joint and slide operations may easily result in scratches on the surface of the mobile phone or pad computer.

Additionally, the aforementioned frames all require extra screws for fixations, screwdrivers are accordingly needed in order to perform combination or disassembly operations to detach the frame bodies. Such assembly and unclamp operations by using tools may become inconvenient for general users.

Yet another type of conventional protective frames is shown in FIG. 3, which is formed by two L-shaped frame bodies 15, 16, with a pivotal axle 153 pivotally connecting therein between; meanwhile, the other end of the frame body 15, 16 remote from the pivotal axle 153 is further configured with a connection element 151 and a combination part 161. In assembly, a frame body 15 can be attached to the lateral side of the mobile phone 2 along the guiding groove 150, while the other frame body 16 can pivotally rotate toward the mobile phone 2 about the pivotal axle 153 until the guiding groove 160 is fully embedded in the mobile phone 2, thus ultimately locking in coercion the connection element 151 to the combination party 161 as if fastening a wristwatch belt thereby completing the assembly operations.

However, in the aforementioned protective frame, since the frame body is required to horizontally slide on the lateral side of the mobile phone during assembly processes, if the installation angle is not prudently maintained, the mobile phone will be scratched or impaired; similarly, suppose the manufacture precision is not sufficiently good, gaps formed between these two frame bodies may be observed from the lateral side of the assembled protective frame. Furthermore, to facilitate simple lock-up actions, the combination ends on the frame body need to be outwardly increased so as to allow fixations with a screw or buckle element; in particular, long-term operations at the coercion position will unavoidably lead to abrasion problems, so the combination firmness in such a protective frame would be questioned, and in case the mobile phone or pad computer accidentally falls on the ground, such a coercive fastening device may be spontaneously released or unlocked and the mobile communication device may as a result separate from the protective frame thus directly hitting the ground.

Moreover, with regards to mobile phones whose power switch is configured on the lateral side thereof, to achieve easy power on/off operations, it usually needs to set up a through hole at the corresponding position on the protective frame and a press key suitably allowing press touches on the power switch of the mobile phone is also installed; consequently, in addition to integral frame perspective and thickness changes due to structural restrictions caused by components like the pivotal axle, connection element and combination part etc., these orifices along with an additional press key would make the entire appearance even more grotesque.

Therefore, the present invention intends to address the issues concerning a design of a protective frame allowing complete shields on the lateral sides of a mobile phone and consistence in lateral side widths of the protective frame such that, in performing the installation of the frame body surrounding the external sides of the mobile phone, a best installation angle can be maintained thereby greatly reducing frictional damages to the mobile phone; a design of duplex structure enabling a frame body totally enveloping the lateral sides of a mobile communication device and allowing the connection element to operate as a power switch for triggering power activation; and, what is more, a design facilitating handy assembly or disassembly processes without using tools.

SUMMARY OF THE INVENTION

An objective of the present invention is to provide a protective clamp frame having a power and unclamp duplex button for mobile communication devices which features a protective frame body assembly in an overlap approach.

Another objective of the present invention is to provide a protective clamp frame having a power and unclamp duplex button for mobile communication devices which allows to release the frame body combination as well as to touch press the power switch on the mobile communication device for power activation with a single connection control key.

Yet another objective of the present invention is to provide a protective clamp frame having a power and unclamp duplex button for mobile communication devices which enables convenient frame assembly and disassembly operations without using tools.

Still another objective of the present invention is to provide a protective clamp frame having a power and unclamp duplex button for mobile communication devices which completely wraps the lateral sides of a mobile communication device.

A protective clamp frame having a power and unclamp duplex button for mobile communication devices according to the present invention is disclosed, wherein the mobile communication device includes a display front side, a back side opposite to the display front side as well as surrounding lateral sides between the front side and the back side, and a power switch is configured on the surrounding lateral side, the protective clamp frame comprising: a main frame forming a closed structure, in which the main frame includes a central recessed accommodating part for accommodation of the mobile communication device; an auxiliary frame having a closed structure for correspondingly overlapping with the main frame, in which the auxiliary frame includes a suppressive part for at least partially suppressing the mobile communication device, and a light transfer part for exposing the display front side; and a set of connection control elements for connecting the main frame to the auxiliary frame; wherein one of the main frame and the auxiliary frame is formed with a clamp part and the connection control element includes a lateral unclamp button, corresponding to the clamp part and enabling lateral movements between a use position allowing interferences with the clamp part and an open position mutually released with the clamp part, in which a longitudinal protrusion is formed in at least one of the clamp part and the lateral unclamp button; and a switch press button, combined to the lateral unclamp button and enabling actions of the power switch in a depth direction vertical to the longitudinal and the lateral directions of the unclamp button.

Therefore, the protective clamp frame having a power and unclamp duplex button for mobile communication devices according to the present invention is characterized in that the main frame and the auxiliary frame are assembled in an overlap fashion, so, in process, the mobile communication device can be wrapped by the main frame and the auxiliary frame, the installation angle thereof may not exceedingly vary and abrasions to the lateral sides can be reduced; in addition, the lateral sides of the mobile communication device are peripherally wrapped and may not be exposed, so the integral smoothness in appearance can be improved. Moreover, the connection control element can release the connection between the main frame and the auxiliary frame and press down in touches with the power switch button on the mobile communication device in order to combine two functional structures required in design for enabling the power switch button configured on the lateral side of the frame as well as frame unclamp/lockup operations without using any tools thereby easily completing the frame assembly or disassembly processes, enhancing convenience for users in assembly or disassembly operations thus achieving all of the aforementioned objectives.

DETAILED DESCRIPTION OF THE PREFERRED EMBODIMENTS

The aforementioned and other technical contents, aspects and effects in relation with the present invention can be clearly appreciated through the detailed descriptions concerning the preferred embodiments of the present invention in conjunction with the appended drawings.

Figure 1:
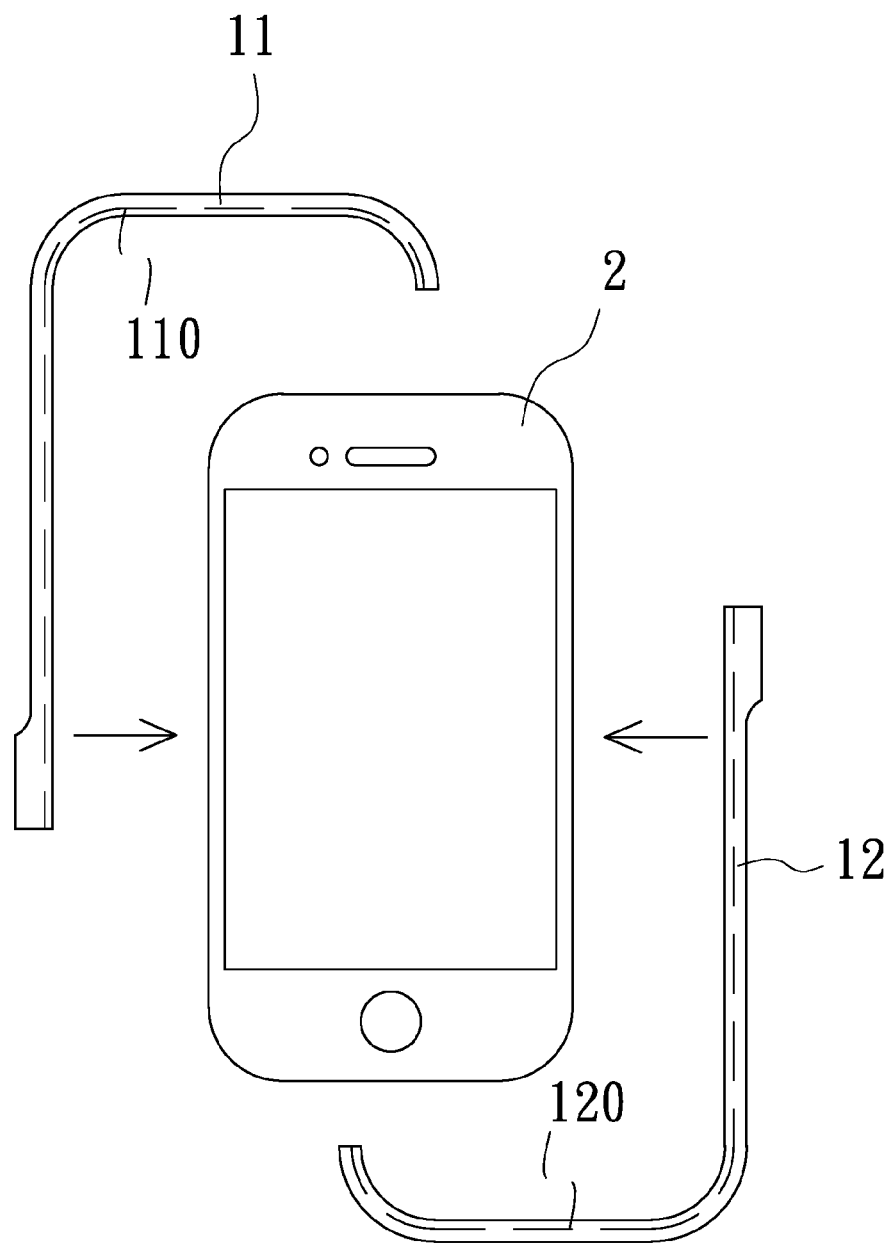
FIG. 1 shows a diagram of a prior art two-staged L-shaped lateral side protective frame for a mobile phone.
Figure 2:
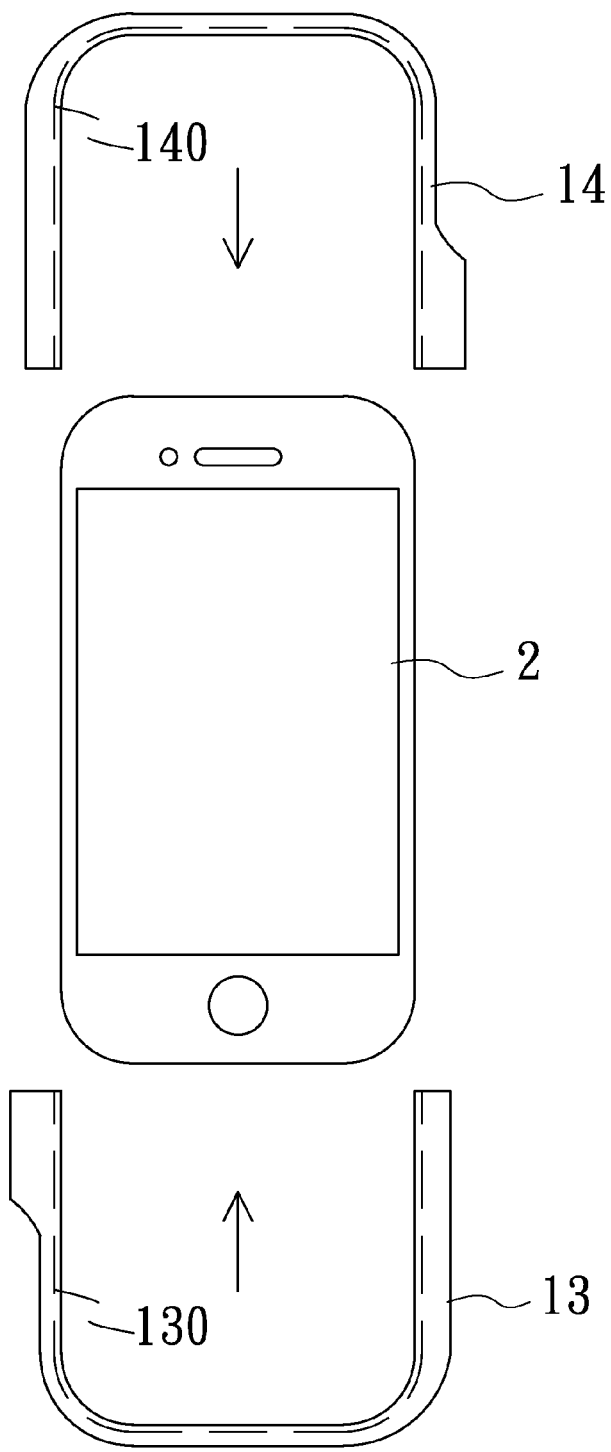
FIG. 2 shows a diagram of a prior art two-staged U-shaped lateral side protective frame for a mobile phone.
Figure 3:
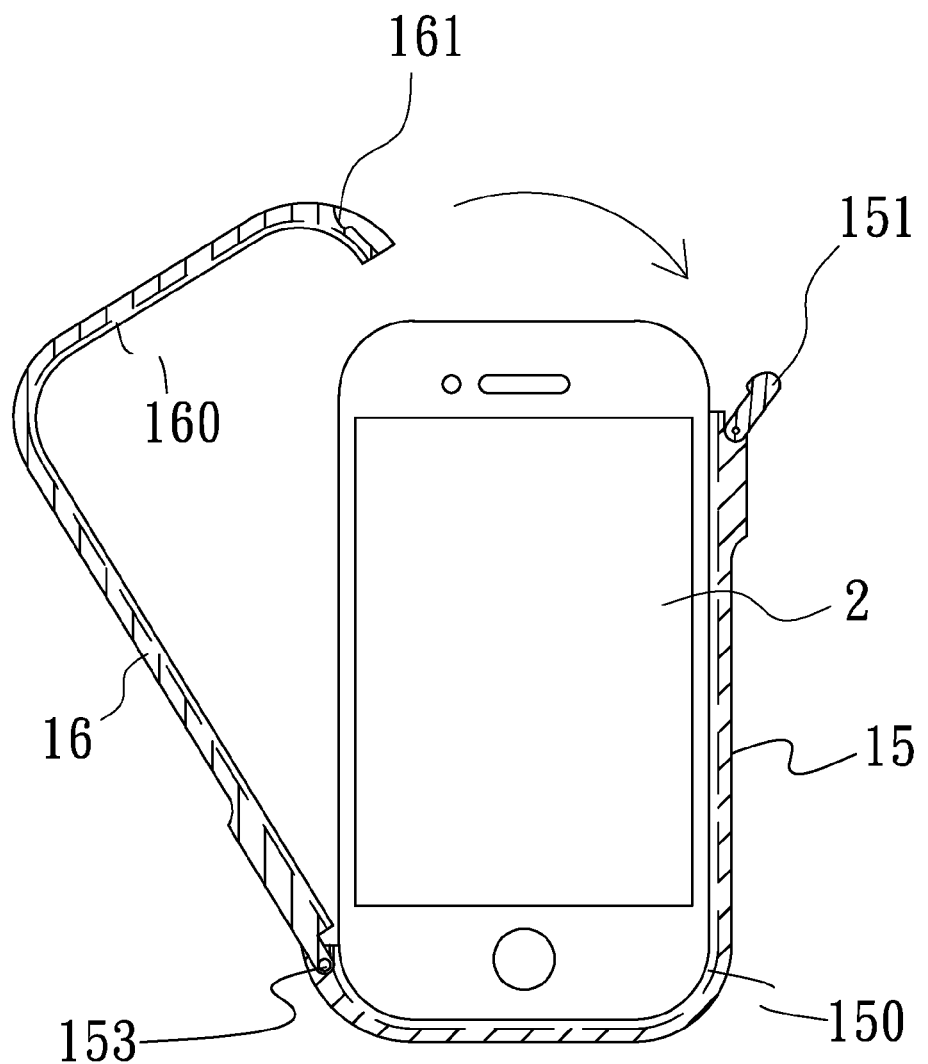
FIG. 3 shows a diagram of a prior art two-staged L-shaped lateral side protective frame characterized in a pivotally axial connection for a mobile phone.
Figure 4:
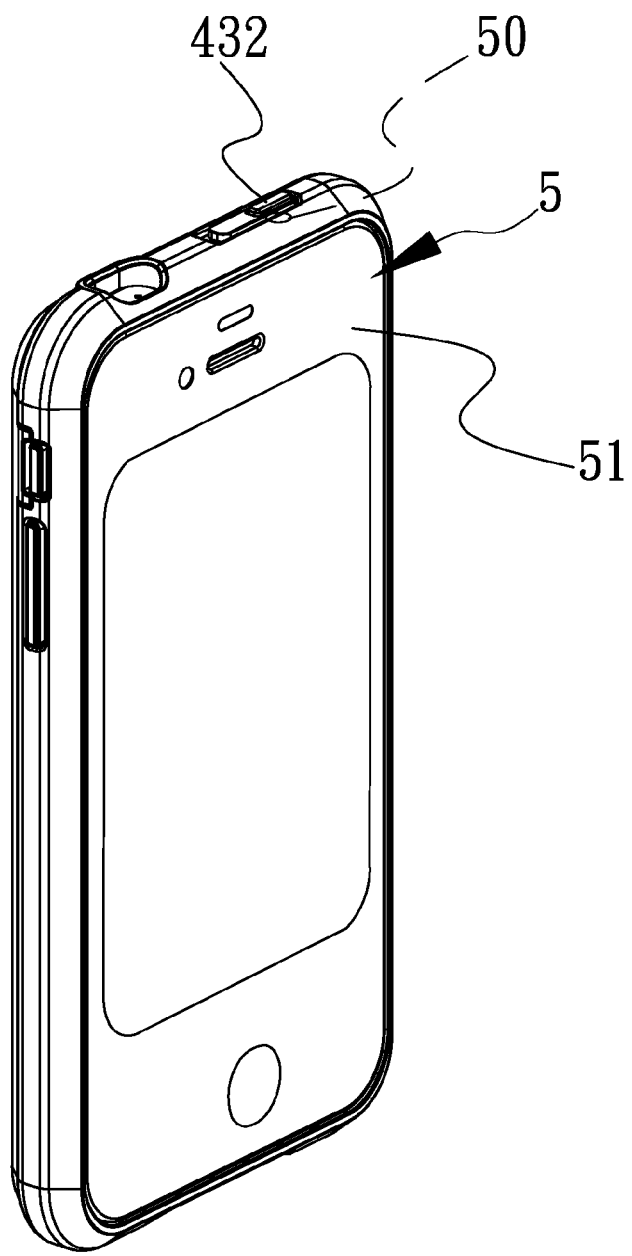
FIG. 4 shows a diagram of a first preferred embodiment for the protective clamp frame having a power and unclamp duplex button for mobile communication devices according to the present invention.
Figure 5:
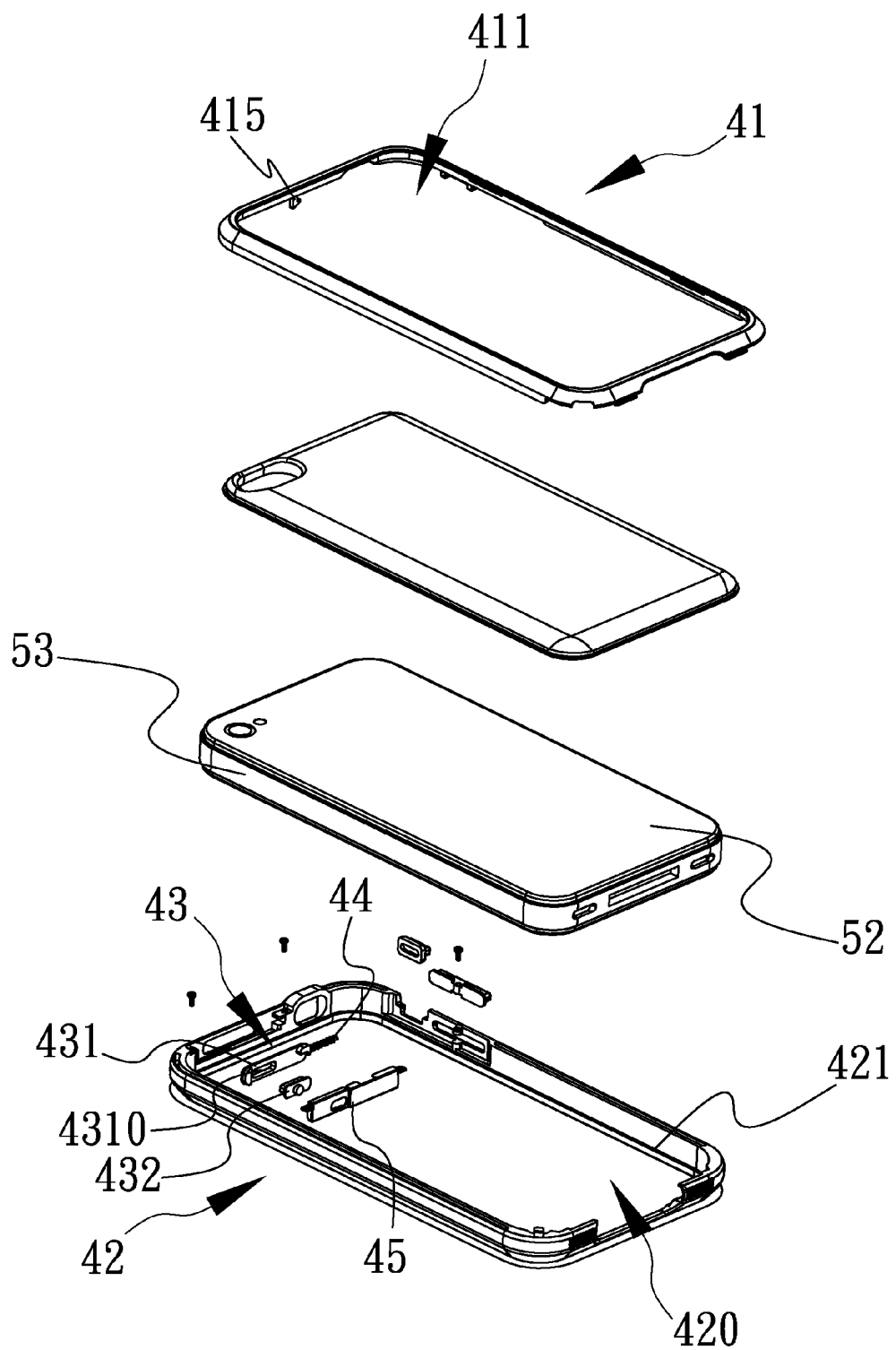
FIG. 5 shows a disassembly diagram of the protective clamp frame for mobile communication devices according to the present invention.

Initially, a first preferred embodiment for the protective clamp frame having a power and unclamp duplex button for mobile communication devices according to the present invention is illustrated. As shown in FIGS. 4 and 5, it essentially comprises a main frame 41, an auxiliary frame 42, a connection control element 43, an elastic element 44 and a retain fixation device 45; herein the mobile communication device is exemplified as a mobile phone 5 having a display front side 51, a back side 52 opposite to the display front side 51 and surrounding lateral sides 53 located between the display front side 51 and the back side 52, in which a power switch 50 is configured on the surrounding lateral side 53.

Furthermore, the main frame 41 is a frame of closed structure, which in the present embodiment has a central recessed accommodating part 411 extending in a direction toward the same side for receiving the mobile phone 5. Similarly, the auxiliary frame 42 is a frame of closed structure, the integral thickness of which is slightly greater than the thickness of the mobile phone 5 and includes a suppressive part 421, and a hollow light transfer part 420 is formed at the central portion thereof. At the same time, referring conjunctively to FIG. 6, a clamp part 415 is configured on the lateral side of the main frame 41, which has a longitudinal protrusion part 4150 further extending from the clamp part 415 toward the assembly direction that mutually overlaps with the auxiliary frame 42, as well as a lateral detent part 4151 extending from the end of the longitudinal protrusion part 4150.

In addition, the connection control element 43 includes a lateral unclamp button 431 and a switch press button 432, wherein the lateral unclamp button 431 can make lateral movements in a direction shown by the arrow in the Figure between a use position interfering with the clamp part 415 and an open position releasing the clamp part 415; besides, the lateral unclamp button 431 has a recess 4311 for receiving the lateral detent part 4151 such that, when disposed at the use position, the lateral unclamp button 431 can hook on the lateral detent part 4151 through the recess 4311.

Moreover, the elastic element 44 is exemplified as a spring and disposed at a position on the lateral side in the press-and-push direction of the lateral unclamp button 431 for applying reverse elastic force; in this way, when the application of force pushing the lateral unclamp button 431 to move toward the open position is over, the elastic force created by the elastic element 44 can cause the lateral unclamp button 431 to return to the use position. Referring to FIG. 5, it can be seen that, on the surface of the lateral unclamp button 431, a hole 4310 is further formed for receiving the switch press button 432 such that the switch press button 432 can act in a depth direction vertical to the longitudinal and lateral directions of the unclamp button, as shown in FIG. 6.

Figure 6:
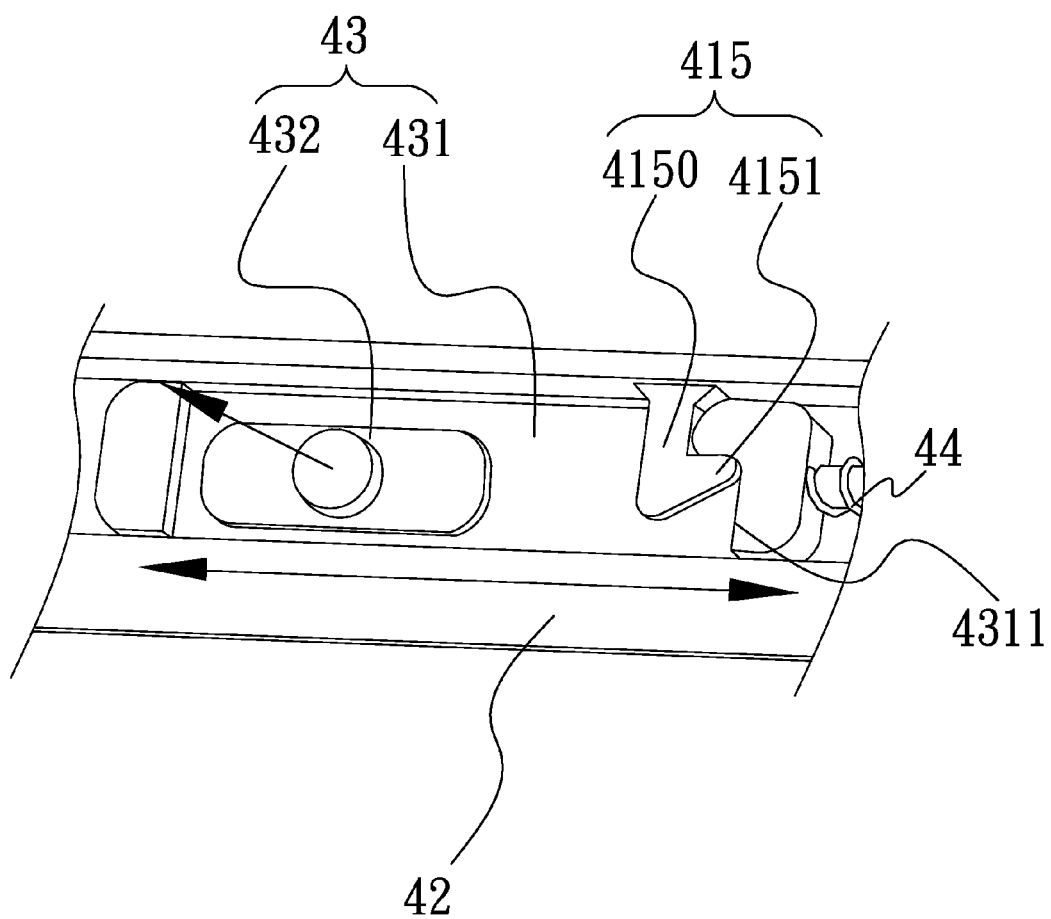
FIG. 6 shows a local enlarged diagram at the connection between the clamp part and the connection control element in the protective clamp frame for mobile communication devices illustrated in FIG. 5.
Figure 7:
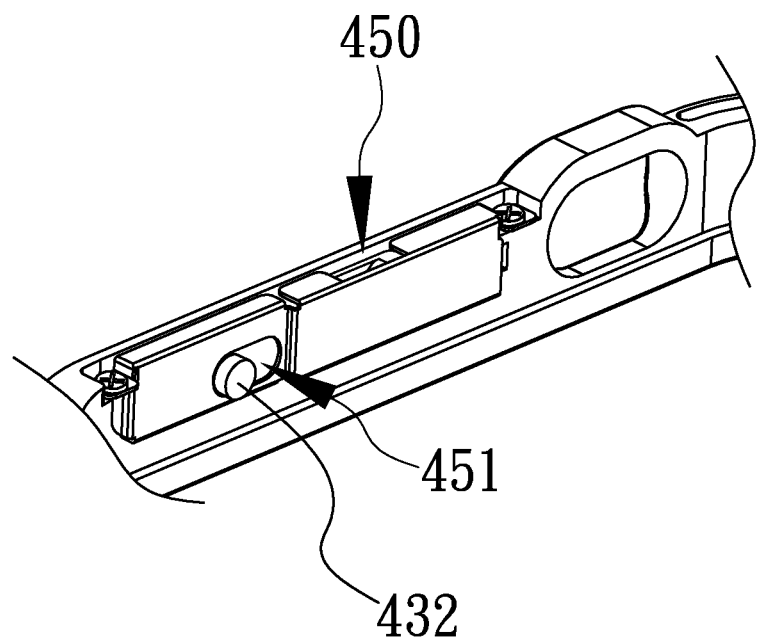
FIG. 7 shows a diagram of the protective clamp frame for mobile communication devices illustrated in FIG. 5 in which the retain fixation device is configured on the auxiliary frame.

Next, referring conjunctively to FIGS. 5 to 7, the connection control element 43 is maintained at a position on the lateral side of the auxiliary frame 42 by means of the retain fixation device 45, and the retain fixation device 45 includes two screw holes for screw fixations onto the auxiliary frame 42. What is more, a through hole 450 is previously formed between the retain fixation device 45 and the auxiliary frame 42 so the clamp part 415 is allowed to longitudinally move in and out. Also, a groove hole 451 is openly formed on the lateral side of the retain fixation device 45 such that the switch press button 432 can move in the lateral direction along with the lateral unclamp button 431.

In assembly, it first disposes the display front side 51 of the mobile phone 5 toward the light transfer part 420 for placement into the auxiliary frame 42, then let the main frame 41 and the auxiliary frame 42 mutually overlap such that the mobile phone 5 is clamp held by the suppressive part 421 and the main frame 41 and kept in place inside the central recessed accommodating part 411, and connect the lateral detent part 4151 and the recess 4311 in fixation such that the main frame 41 and the auxiliary frame 42 can be fixedly combined in overlaps. Seeing that the installation position of the switch press button 432 in the connection control element 43 corresponds to the power switch 50 on the mobile phone 5, the power switch 50 can be triggered to power on upon pressing down the switch press button 432. On the other hand, to take out the mobile phone 5, it is possible to press down the lateral unclamp button 431 to release the connection between the lateral detent part 4151 and the recess 4311 thereby separating the main frame 41 from the auxiliary frame 42.

Although, in the present embodiment, the clamp part 415 is configured on the main frame 41 and the connection control element 43 is set up on the auxiliary frame 42, for those skilled ones having common knowledge in the art, it can be appreciated that the installation positions of the connection control element 43 and the clamp part 415 can be mutually exchanged. Analogously, the installation position of the fixation device 45 as well as the formation position between the lateral detent part 4151 and the recess 4311 can be also swapped to achieve the same effect. Therefore all of such modifications fall within the scope of the present invention.

Figure 8:
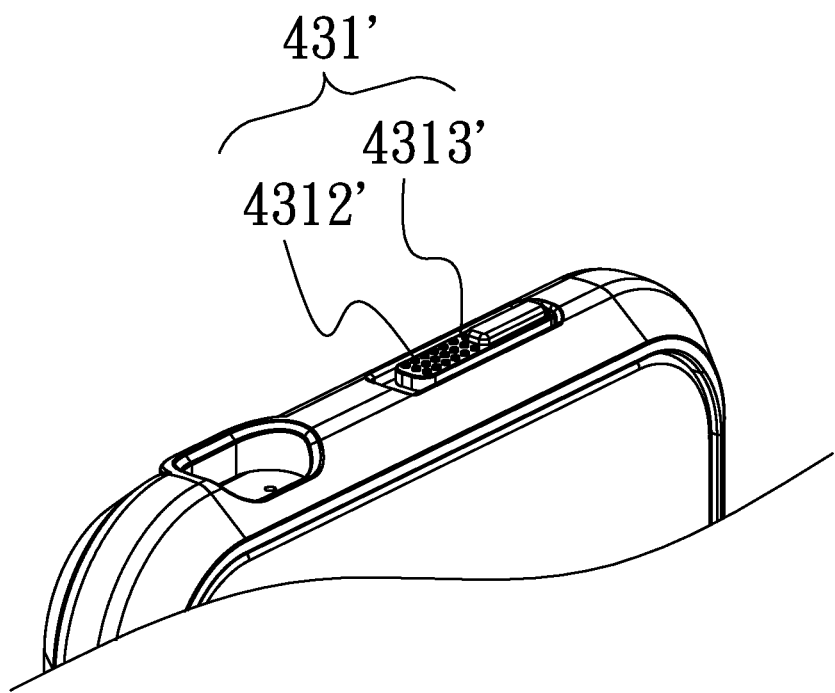
FIG. 8 shows a local enlarged diagram of a second preferred embodiment for the protective clamp frame having a power and unclamp duplex button for mobile communication devices according to the present invention, indicating that multiple frictional protrusions are formed on the surface of the lateral unclamp button.

Subsequently, a second preferred embodiment for the protective clamp frame having a power and unclamp duplex button for mobile communication devices according to the present invention is illustrated. As shown in FIG. 8, in the present embodiment, multiple frictional protrusions 4312' are further formed on the external surface 4313' of the lateral unclamp button 431' such that, in press unclamping, more friction force can be created thereby improving the stability during the press-down operation.

Hence, a protective clamp frame having a power and unclamp duplex button for mobile communication devices according to the present invention features a protective frame body assembly in an overlap approach such that the mobile communication device can be peripherally wrapped by the main frame and the auxiliary frame, and, additionally, the connection control element can release the connection between the main frame and the auxiliary frame and trigger the power switch on the mobile communication device so the connection control element effectively enables a duplex structure. In this way, certain extra structures necessarily configured on the lateral side of conventional frames can be effectively removed and the thickness of the auxiliary frame becomes slightly greater than the thickness of the mobile communication device such that the lateral side can be entirely wrapped and the width of the lateral side can be consistently maintained, thus improving integral smooth and streamlined appearance without perspective inconsonance.

Moreover, the installation angle between the main frame and the auxiliary frame will not significantly vary which differs from conventional protective frame assembly processes so that abrasions to the lateral side of the mobile communication device can be greatly reduced. At the same time, the frame assembly or disassembly operations can be easily completed without using any additional tools thereby increasing user's convenience and achieving all of the objectives as previously described.

It should be noticed that, however, the illustrations set forth as above simply describe the preferred embodiments of the present invention which are not to be construed as restrictions for the scope of the present invention; contrarily, all effectively equivalent changes and modifications conveniently made in accordance with the claims and specifications disclosed in the present invention are deemed to be encompassed by the scope of the present invention delineated in the following claims.

What is claimed is:

1. A protective clamp frame having a power and unclamp duplex button for mobile communication devices, wherein the mobile communication device includes a display front side, a back side opposite to the display front side as well as surrounding lateral sides between the front side and the back side, and a power switch is configured on the surrounding lateral side; the protective clamp frame comprising:
    a main frame forming a closed structure, in which the main frame includes a central recessed accommodating part for receiving the mobile communication device;
    an auxiliary frame having a closed structure for correspondingly overlapping with the main frame, in which the auxiliary frame includes a suppressive part for at least partially suppressing the mobile communication device as well as a light transfer part for exposing the display front side;
    a connection control element for connecting the main frame to the auxiliary frame;
    wherein one of the main frame and the auxiliary frame is formed with a clamp part, and the connection control element includes
    a lateral unclamp button corresponding to the clamp part and enabling lateral movements between a use position allowing interferences with the clamp part and an open position mutually released with the clamp part, in which a longitudinal protrusion is formed in at least one of the clamp part and the lateral unclamp button; and a switch press button combined to the lateral unclamp button and enabling actions of the power switch in a depth direction vertical to the longitudinal and the lateral directions of the lateral unclamp button; and a retain fixation device for combining to the other one of the main frame and the auxiliary frame thereby limiting the connection control element in position;

wherein the retain fixation device is further formed with a through hole allowing longitudinal in/out actions of the clamp part.

2. The protective clamp frame having a power and unclamp duplex button for mobile communication devices according to claim 1, further comprising an elastic element pushing against the lateral unclamp button from the open position upward to the use position.

3. The protective clamp frame having a power and unclamp duplex button for mobile communication devices according to claim 2, wherein the elastic element is a spring.

4. The protective clamp frame having a power and unclamp duplex button for mobile communication devices according to claim 1, wherein the clamp part includes the longitudinal protrusion and a lateral detent part extending from the longitudinal protrusion, and the lateral unclamp button is formed with a recess for receiving the lateral detent part when disposed at the use position.

5. The protective clamp frame having a power and unclamp duplex button for mobile communication devices according to claim 1, wherein the lateral unclamp button includes the longitudinal protrusion and a lateral detent part extending from the longitudinal protrusion, and the clamp part is formed with a recess for receiving the lateral detent part when the lateral unclamp button is disposed at the use position.

6. The protective clamp frame having a power and unclamp duplex button for mobile communication devices according to claim 1, wherein the lateral unclamp button includes an external surface and multiple frictional protrusions are formed on the external surface.

7. The protective clamp frame having a power and unclamp duplex button for mobile communication devices according to claim 1, wherein the retain fixation device is screw jointed to the other one of the main frame and the auxiliary frame.

8. The protective clamp frame having a power and unclamp duplex button for mobile communication devices according to claim 1, wherein the retain fixation device is further formed with a groove hole allowing movements of the switch press button conjunctively with the lateral unclamp button along the lateral direction and in/out actions along the depth direction.

9. A protective clamp frame having a power and unclamp duplex button for mobile communication devices, wherein the mobile communication device includes a display front side, a back side opposite to the display front side as well as surrounding lateral sides between the front side and the back side, and a power switch is configured on the surrounding lateral side; the protective clamp frame comprising:

a main frame forming a closed structure, in which the main frame includes a central recessed accommodating part for receiving the mobile communication device;

an auxiliary frame having a closed structure for correspondingly overlapping with the main frame, in which the auxiliary frame includes a suppressive part for at least partially suppressing the mobile communication device as well as a light transfer part for exposing the display front side;

a connection control element for connecting the main frame to the auxiliary frame;

wherein one of the main frame and the auxiliary frame is formed with a clamp part, and the connection control element includes a lateral unclamp button corresponding to the clamp part and enabling lateral movements between a use position allowing interferences with the clamp part and an open position mutually released with the clamp part, in which a longitudinal protrusion is formed in at least one of the clamp part and the lateral unclamp button; and a switch press button combined to the lateral unclamp button and enabling actions of the power switch in a depth direction vertical to the longitudinal and the lateral directions of the lateral unclamp button; and a retain fixation device for combining to the other one of the main frame and the auxiliary frame thereby limiting the connection control element in position;

wherein the retain fixation device is further formed with a groove hole allowing movements of the switch press button conjunctively with the lateral unclamp button along the lateral direction and in/out actions along the depth direction.

10. A protective clamp frame having a power and unclamp duplex button for mobile communication devices, wherein the mobile communication device includes a display front side, a back side opposite to the display front side as well as surrounding lateral sides between the front side and the back side, and a power switch is configured on the surrounding lateral side; the protective clamp frame comprising:

a main frame forming a closed structure, in which the main frame includes a central recessed accommodating part for receiving the mobile communication device;

an auxiliary frame having a closed structure for correspondingly overlapping with the main frame, in which the auxiliary frame includes a suppressive part for at least partially suppressing the mobile communication device as well as a light transfer part for exposing the display front side; and a connection control element for connecting the main frame to the auxiliary frame;

wherein one of the main frame and the auxiliary frame is formed with a clamp part, and the connection control element includes a lateral unclamp button corresponding to the clamp part and enabling lateral movements between a use position allowing interferences with the clamp part and an open position mutually released with the clamp part, in which a longitudinal protrusion is formed in at least one of the clamp part and the lateral unclamp button; and a switch press button combined to the lateral unclamp button and enabling actions of the power switch in a depth direction vertical to the longitudinal and the lateral directions of the lateral unclamp button;

wherein the clamp part includes the longitudinal protrusion and a lateral detent part extending from the longitudinal protrusion, and the lateral unclamp button is formed with a recess for receiving the lateral detent part when disposed at the use position.

* * * * *